(12) United States Patent
Gupta

(10) Patent No.: US 9,811,663 B2
(45) Date of Patent: *Nov. 7, 2017

(54) GENERIC UNPACKING OF APPLICATIONS FOR MALWARE DETECTION

(71) Applicant: McAfee, Inc., Santa Clara, CA (US)

(72) Inventor: Deepak Gupta, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,983

(22) Filed: Sep. 16, 2016

(65) Prior Publication Data

US 2017/0004308 A1 Jan. 5, 2017

Related U.S. Application Data

(63) Continuation of application No. 13/838,663, filed on Mar. 15, 2013, now Pat. No. 9,471,783.

(51) Int. Cl.
*G06F 21/00* (2013.01)
*G06F 21/56* (2013.01)

(52) U.S. Cl.
CPC .......... *G06F 21/562* (2013.01); *G06F 21/564* (2013.01); *G06F 21/566* (2013.01)

(58) Field of Classification Search
CPC ........................................ G06F 21/56–21/568
See application file for complete search history.

(56) References Cited

U.S. PATENT DOCUMENTS

| 7,996,904 | B1 | 8/2011 | Chiueh et al. |
| 2003/0115479 | A1 | 6/2003 | Edwards et al. |
| 2005/0091512 | A1 | 4/2005 | Shipp |
| 2005/0172337 | A1 | 8/2005 | Bodorin et al. |
| 2007/0074026 | A1 | 3/2007 | Hicks |
| 2008/0263659 | A1 | 10/2008 | Alme |
| 2010/0011441 | A1 | 1/2010 | Christodorescu et al. |
| 2011/0258163 | A1 | 10/2011 | Volkoff et al. |
| 2012/0090031 | A1 | 4/2012 | Fossen et al. |

FOREIGN PATENT DOCUMENTS

| CN | 102402449 A | 4/2012 |
| KR | 10-2010-0073126 A | 7/2010 |

OTHER PUBLICATIONS

International Search Report and Written Opinion received for PCT Patent Application No. PCT/US2014/019960, dated Jun. 18, 2014, 10 pages.
Martignoni, et al., (2007), "OmniUnpack: Fast, Generic, and Safe Unpacking of Malware", IEEE 23rd Annual Computer Security Applications Conference, pp. 431-440.

*Primary Examiner* — John B King
(74) *Attorney, Agent, or Firm* — Blank Rome, LLP

(57) ABSTRACT

A technique for detecting malware in an executable allows unpacking of a packed executable before determining whether the executable is malware. In systems with hardware assisted virtualization, hardware virtualization features may be used to iteratively unpack a packed executable in a controlled manner without needing knowledge of a packing technique. Once the executable is completely unpacked, malware detection techniques, such as signature scanning, may be employed to determine whether the executable contains malware. Hardware assisted virtualization may be used to facilitate the scanning of the run-time executable in memory.

25 Claims, 8 Drawing Sheets

GENERIC UNPACKING OF APPLICATIONS FOR MALWARE DETECTION

TECHNICAL FIELD

This disclosure relates generally to a system and method to unpack executable binaries such that less reliance is placed on multiple signatures (e.g., one for each packing method) to identify potential malware being maintained in virus signature DAT files. More particularly, but not by way of limitation, this disclosure relates to using hardware-assisted virtualization when unpacking a packed executable file to determine its original entry point and, prior to execution of original entry point, performing a formal scan of the executable once it reaches its fully expanded form.

BACKGROUND

Contemporary delivery of application code typically involves its compression through a packing process. By using a packing process, binary file sizes may be reduced, and multiple files may be combined into one file. Modern packing processes create "self-extracting executables," which may be executed to unpack the contents of the packed code. That is, the packed code itself is accompanied by an executable code section that, when executed, results in inflating or uncompressing the packed code. Accordingly, running a self-extracting executable can result in the packed code executable being expanded on disk, in memory, or both.

When packing a file to create a self-extracting executable, many different types of compression algorithms and packing techniques may be employed. Some of these are well-known and documented while others are not. Employing different techniques on the same file to create a self-extracting executable will result in different files—both the packing code and the packed code may be different because of different packers and varying results from different compression algorithms. Further, if unknown or undocumented techniques are used to pack the file into a self-extracting executable, it may be difficult to even determine the distinction between the packing code and the packed code.

These characteristics of self-extracting executables are often exploited by malware developers to hide malware from antivirus programs or malware detection programs. One common method to detect malware is signature scanning. With signature scanning, files are scanned for bit patterns, or signatures, that are known or suspected to be associated with malware. When a bit pattern in a file matches a signature of known malware, then that file can be identified as being, or containing, malware. However, a signature of a malicious executable can be easily changed in an effort to obfuscate the executable. When malware is packed, detection may be avoided because the known signature of the unpacked malware will not match any bit pattern of the packed malware file.

To attempt to overcome these efforts to hide malware, antivirus programs and malware detection programs may employ multiple techniques. One technique is to extract the packed code in memory without executing it and then attempt to scan the uncompressed binary for malware signatures. Packed code may be extracted by emulating its execution or, if the packing algorithm is known, performing the extraction by the antivirus program. If the packing technique is not well-known or documented, extracting the packed code under the control of the antivirus program may not be possible. Also, many packing algorithms use anti-emulation and anti-debugging techniques to simply terminate the unpacking process after detecting that the unpacking is being performed by a debugger or through execution emulation. Time stamping parts of the code flow is a standard method that may be used to determine that code is being emulated. Similarly, identifying that code is being debugged may be easily determined by inquiring to the operating system.

Even if the self-extracting executable is allowed to execute or be emulated, an antivirus program may have difficulty in determining when the unpacking part of execution is complete and when the originally compressed executable begins execution. In a self-extracting executable, the unpacking code and the packed executable are part of the same binary, and determining the distinction between the two in memory can be difficult.

Another technique to overcome the efforts to hide malware is to add signatures of known self-extracting executables which contain malware into an antivirus signature database once such a new signature of packed malware is identified. A weakness to this technique is that it may be easily avoided by slightly altering the packer code or the packing technique, resulting in a different self-extracting executable, and thus a different signature. Adding signatures accounting for these variations in packing techniques to the antivirus signature database serves to increase the size of the signature database. This causes a problem in that the number of signatures and the difficulty of maintaining of signature files can correspondingly increase. Further, these efforts may be further thwarted because the packing process can be repeated any number of times using different packing algorithms in different orders, creating an even greater number of signatures to identify and maintain.

DETAILED DESCRIPTION

As explained above, the availability of different packers and the fact that an executable can be packed multiple times result in making identification of a packed malicious executable by comparing it to a signature difficult. Each identified variant of a packed malicious executable might need its own signature in a virus signature database of an antivirus program. This causes virus signature databases to grow and increases maintenance costs and efforts—the signature file updates must be communicated to and downloaded by end-user computers utilizing the antivirus program. Further, determining when to apply a signature detection algorithm is complicated by these same factors.

As also explained above, attempting to unpack a packed file to expose the original executable presents challenges as well. Because the unpacking code is combined with the packed executable, it may be difficult to identify the moment at which the unpacking code completes execution and the original binary begins execution. In order to avoid execution of the original executable, the antivirus program may attempt to unpack the packed executable, rather than letting the unpacker code execute. To do this, the antivirus program must be equipped with the unpacking algorithm used to pack the executable. When unknown or undocumented packing techniques are utilized, however, the antivirus program may not be able to unpack the software. In these types of instances, the antivirus software must be updated by including the unpacker algorithm. Because unpacker algorithms may be sophisticated, it may take considerable time—months or years—for antivirus software developers to incorporate solutions for newly discovered packing algorithms. Further, these efforts could be circumvented or made more onerous by even slight alterations to the packer algorithm.

As explained further below, techniques are disclosed to address these and other problems by using systems and methods to generically unpack a singly or multiply packed application in a controlled manner to detect malware. Generically unpacking a packed application allows the application to be unpacked independent of knowledge of the unpacking algorithm and independent of knowledge of the implementation of the unpacking stub. Functionality associated with hardware-assisted virtualization may be utilized to help generically unpack the packed application in a controlled manner. These techniques may reduce or eliminate the need to maintain a plurality of signatures for a single type of malware.

Figure 1:
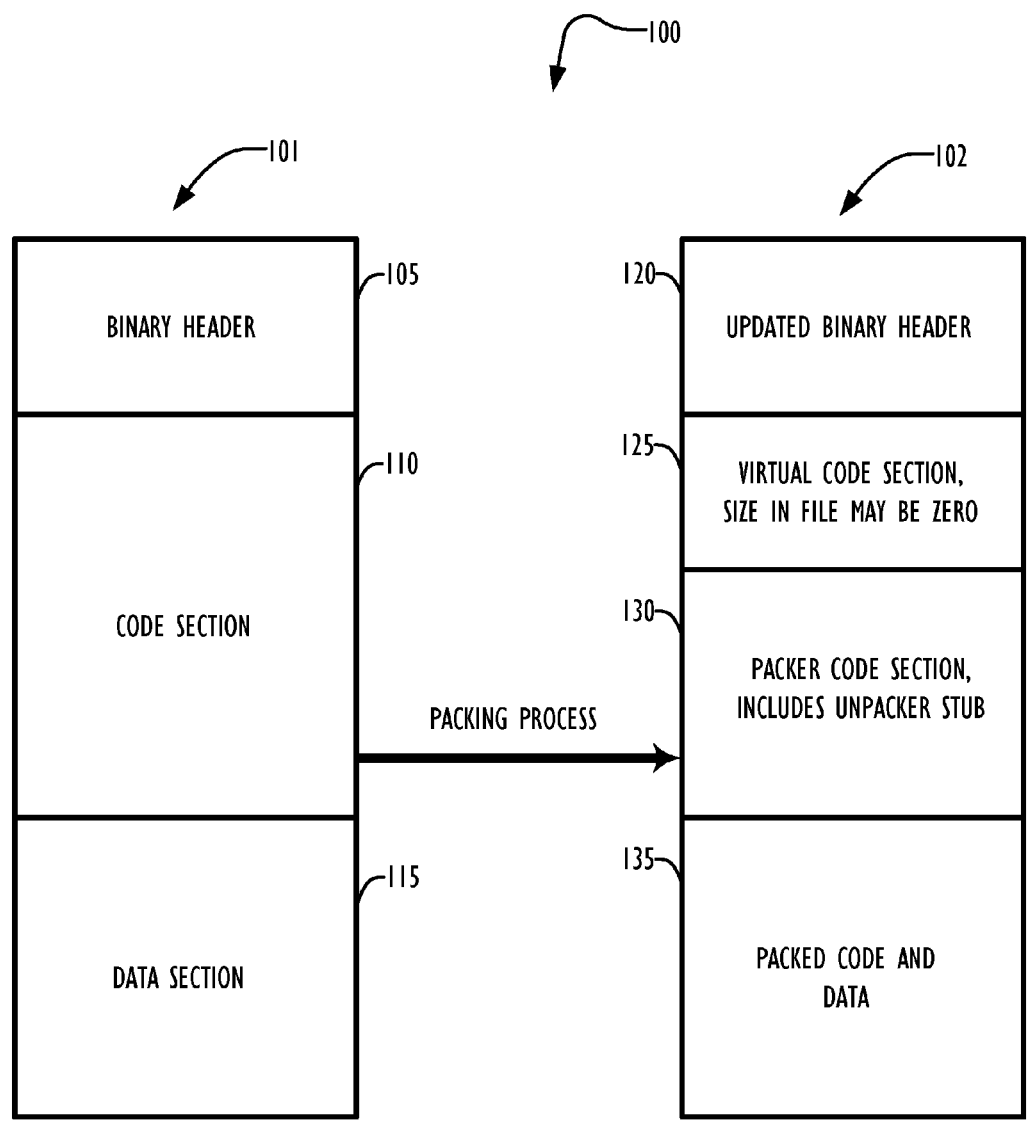
FIG. 1 is a block diagram 100 illustrating a simplified structure of an executable file 101 and a compressed self-extracting executable 102 (presumably of smaller size) as known in the prior art.

Referring to FIG. 1, block diagram 100 illustrates the internal sections within two files—an executable file and a packed version of that file according to the prior art. Generic executable 101 represents an executable binary in expanded (i.e., run-time) form. Packed executable 102, which is the result of the generic executable 101 being modified through a packing process, is also illustrated. Executable 101 may have been created by a developer performing a compile and link process on source code, object files, and libraries. Executable 101 may be organized into three different sections. Binary header 105 holds information about the organization of the rest of the executable binary, including code section(s) 110 and data section(s) 115. Binary header 105 also includes memory permissions for all the sections included in file which will be enforced by an operating system loader when the executable 101 is loaded into memory. When loaded into memory, each section starts at a boundary of a memory page that is defined by the operating system. A section from the file does not have to only encompass one memory page—rather, each section can span an integral number of pages.

Program execution starts (i.e., run-time) from a location within one of the code sections in an executable binary 101 that is commonly referred to as the "Entry Point" of a program. The Entry Point can be anywhere in the code section depending on where compiler/assembler has put the 'main' function in a binary. The Entry Point does not need to start on the start of any particular code section, which also means that the Entry Point does not necessarily start at the start of any particular memory page.

A packer can pack and compress executable file 101 to create a packed executable file 102 via what is referred to herein as a packing process. Typical packers can perform complex and unique operations, but almost all packers perform a relatively simple set of operations when viewed from a high level, as will be described here. In creating packed executable 102, the packer process compresses the code section(s) 110 and data section(s) 115 of executable 101 using a compression algorithm on the sections. This is typically primarily performed in an effort to reduce the file size of the executable, but, as in the case of malware, it may be performed primarily to change the signature of the malware. Once the sections are compressed, they can be placed in a new section, packed code and data 135, in packed executable file 102. Alternatively, packers may also pack the code and data into the same section in which the unpacking code is contained. Thus, the packer code section 130 and packed code and data 135 may be in separate sections or in one section.

The packing process also typically creates a virtual code section 125 with a predetermined size that it will take in memory when executed. This size is typically calculated to be greater than or equal to the size of the uncompressed packed code and data 135, as it would be found in original executable 101. Because virtual code section 125 is a section intended for uncompressed data in memory, it does not necessarily occupy any space in the packed executable 102 itself. Rather, its size in the file containing the packed executable 102 may be reflected as a number of memory pages needed in memory prior to execution of the uncompress process of the packer code. The details of the virtual code section 125 are specified in the changed binary header 120 by packer conversion code. When a binary executable will be loaded into memory by an operating system, the number of memory pages that a particular section will take in memory is also typically specified in a binary header (e.g., 105 or 120). So, even if a section size on an executable file on disk is zero, that section may take some space in memory when loaded by an operating system. Thus, the packing process has reduced the size of the whole binary file (i.e., disk size and download size) by compressing the code and data but has made provision for adequate memory to hold the uncompressed code and data when unpacked into memory at execution.

Alternatively, rather than using a virtual code section 125, the unpacker stub that resides in packer code section 130 can allocate sufficient process memory during execution to hold the uncompressed code and data while unpacking in memory. However, the unpacker stub must still mark these memory pages as executable to execute them, and this may be monitored. Therefore, once execution starts, if memory pages are allocated with execution permissions, these memory pages may be identified as possibly containing uncompressed code and data. If this technique for memory allocation is used, the allocated memory range can be identified by monitoring memory allocation, and the allocated memory range may be treated as virtual code section 125. Because most packers employ the technique of using virtual code section 125 as a placeholder for uncompressed code and data, this technique is referenced in the examples below.

Packer code section 130 is a new code section added in packed executable 102 that contains the run-time unpacker stub code. This unpacker stub will read packed code and data from packed code and data section 135, uncompress it, and place it in virtual code section 125. More specifically, the uncompressed code can be placed into the memory allocated to hold the virtual code section. During the original packing process the binary header 105 is modified to binary header 120 to make sure that the Entry Point field of the header will invoke the unpacker stub in packer code section 135.

Figure 2:
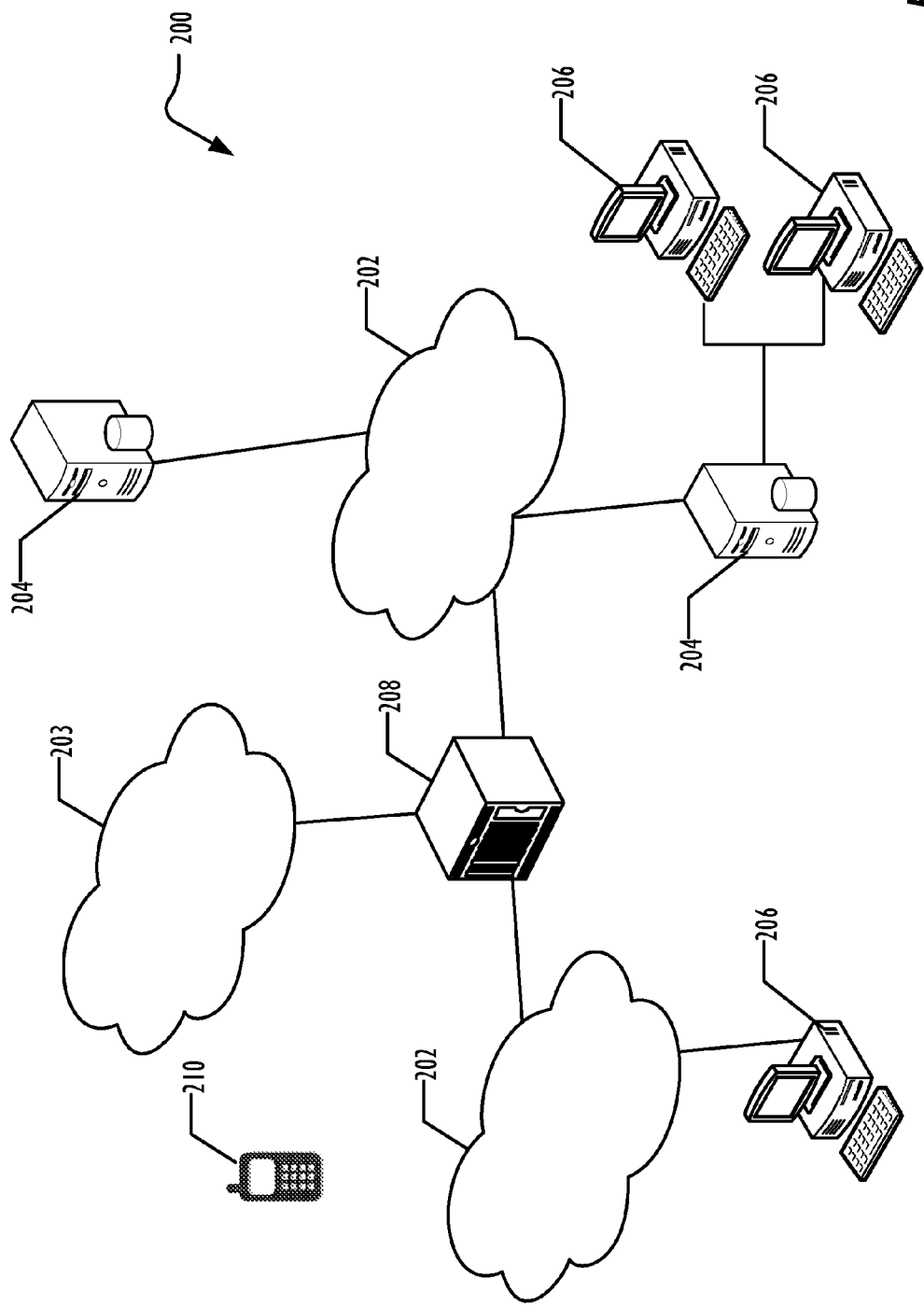
FIG. 2 is a block diagram illustrating a network architecture 300 capable of being configured to facilitate one or more disclosed embodiments.

The packing, transmission, and subsequent unpacking of an executable may be performed in the context of a network infrastructure. Referring now to FIG. 2, infrastructure 200 is shown schematically. Infrastructure 200 contains computer networks 202. Computer networks 202 include many different types of computer networks available today such as the Internet, a corporate network or a Local Area Network (LAN). Each of these networks can contain wired or wireless devices and operate using any number of network protocols (e.g., TCP/IP). Networks 202 are connected to gateways and routers (represented by 208), end user computers 206 and computer servers 204. Also shown in infrastructure 200 is cellular network 203 for use with cellular communication. As is known in the art, cellular networks support cell phones and many other types of devices (e.g., tablet computers not shown). Cellular devices in the infrastructure 200 are illustrated as cell phones 210. Any of the devices shown in infrastructure 200 could attempt to execute a self-extracting executable. If the processor of the device includes the required capabilities, the concepts of this disclosure could be implemented therein. Infrastructure 200 is illustrative and by way of example only, and other infrastructures can be employed in the disclosed techniques as desired.

Figure 3:
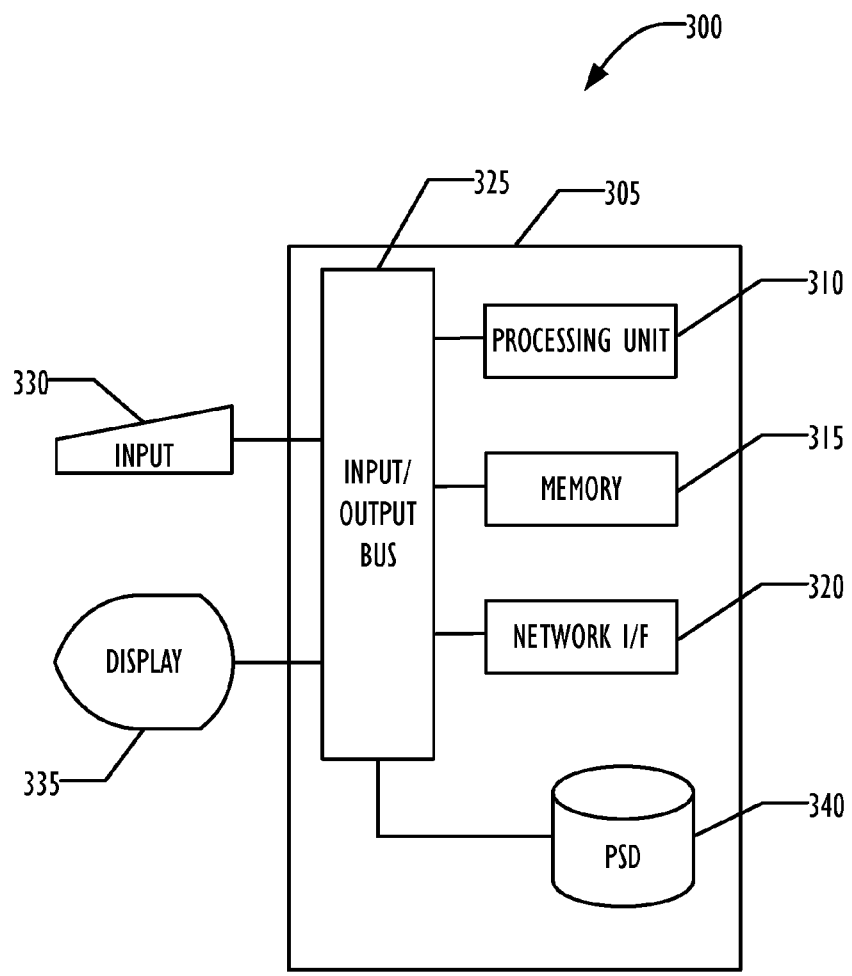
FIG. 3 is a block diagram illustrating a computer with a processing unit which could be configured according to one or more disclosed embodiments.

Referring now to FIG. 3, an example processing device 300 for use in the disclosed techniques according to various embodiments is illustrated in block diagram form. Processing device 300 may be implemented in various devices, such as in a cellular phone 210, a gateway or router 208, a client computer 206, or a server computer 204. Example processing device 300 comprises a system unit 305 which may be optionally connected to an input device 330 (e.g., keyboard, mouse, touch screen, etc.) and display 335. A program storage device (PSD) 340 (sometimes referred to as a hard disc, flash memory, or computer-readable medium) is included with the system unit 305. Also included with system unit 305 may be a network interface 320 for communication via a network (such as cellular network 203 or computer network 202) with other computing and corporate infrastructure devices (not shown) or other cellular communication devices. Network interface 320 may be included within system unit 305 or be external to system unit 305. In either case, system unit 305 is communicatively coupled to network interface 320. Program storage device 340 represents any form of non-volatile storage including, but not limited to, all forms of optical and magnetic memory, including solid-state, storage elements, including removable media, and may be included within system unit 305 or be external to system unit 305. Program storage device 340 may be used for storage of software to control system unit 305, data for use by the processing device 300, or both.

System unit 305 may be programmed to perform methods in accordance with this disclosure. System unit 305 comprises one or more processing units (represented by processing unit, or processor, 310), input-output (I/O) bus 325, and memory 315. Memory 315 may be accessed using the communication bus 325. Processing unit 310 may include any programmable controller device including, for example, a mainframe processor, a cellular phone processor, or one or more members of the INTEL® ATOM™, INTEL® CORE™, PENTIUM® and CELERON® processor families from Intel Corporation and the Cortex and ARM processor families from ARM. (INTEL, INTEL ATOM, CORE, PENTIUM, and CELERON are trademarks of the Intel Corporation. CORTEX is a registered trademark of the ARM Limited Corporation. ARM is a registered trademark of the ARM Limited Company). Memory 315 may include one or more memory modules and comprise random access memory (RAM), read only memory (ROM), programmable read only memory (PROM), programmable read-write memory, and solid-state memory. Processing unit 310 may also include some internal memory including, for example, cache memory or memory dedicated to a particular processing unit and isolated from other processing units for use in unpacking an executable binary.

Processing device 300 may have resident thereon any desired operating system. Embodiments of disclosed detection techniques may be implemented using any desired programming language, and may be implemented as one or more executable programs, which may link to external libraries of executable routines that may be supplied by the provider of the detection software/firmware, the provider of the operating system, or any other desired provider of suitable library routines. As used herein, the term "a computer system" can refer to a single computer or a plurality of computers working together to perform the function described as being performed on or by a computer system.

Figure 4:
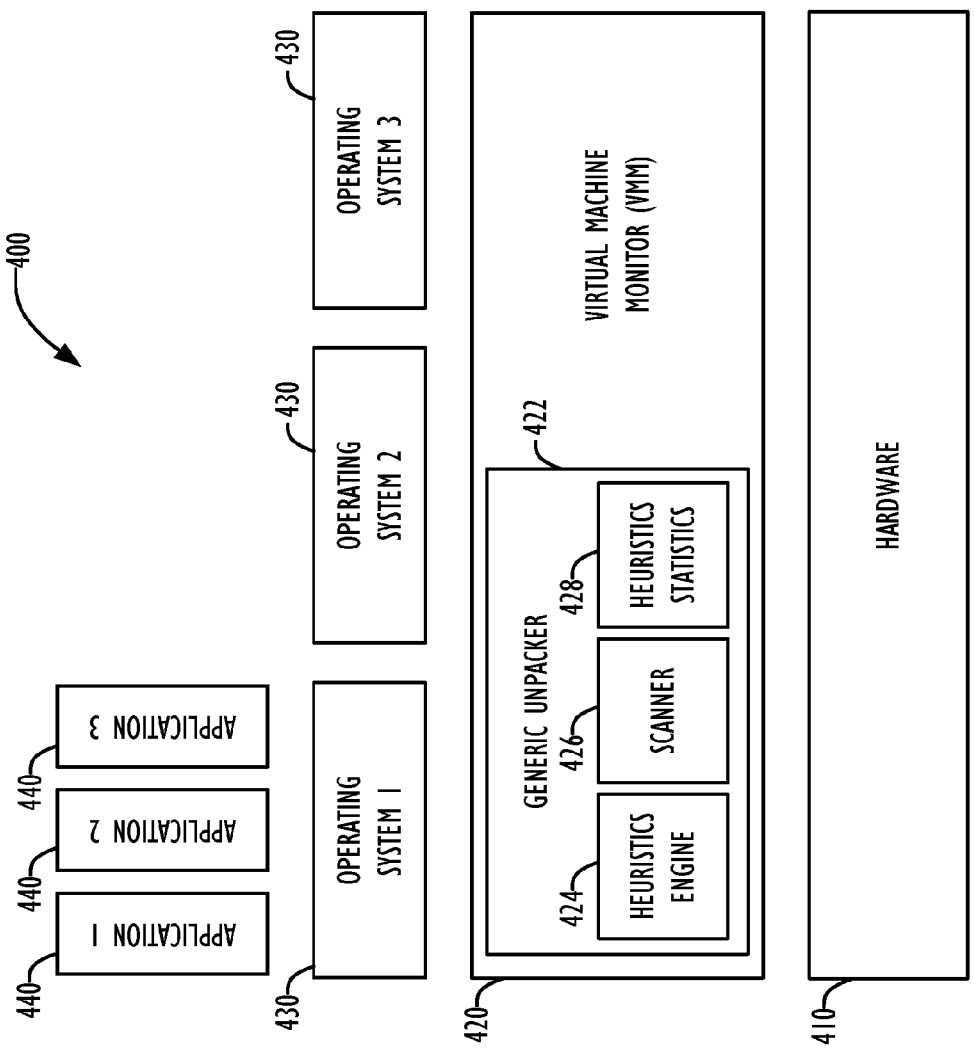
FIG. 4 is a block diagram illustrating a software stack of a computer system with a virtual machine monitor, guest operating systems, and applications.

In preparation for performing disclosed embodiments on processing device 300, program instructions to configure processing device 300 to perform disclosed embodiments may be provided stored on any type of non-transitory computer-readable media, or may be downloaded from a server 204 onto program storage device 340. Even though a single processing device 300 is illustrated in FIG. 4, any number of processing devices 300 may be used in a device configured according to disclosed embodiments.

Hardware-Assisted Virtualization

Virtualization is a feature which allows a computer system or device to run multiple operating systems in parallel without making any modification in operating system code. This type of virtualization may be differentiated from para-virtualization, which requires modifications to the hosted operating systems. Many recent consumer-based execution processors support hardware-assisted virtualization. Referring to FIG. 4, the Virtual Machine Monitor (VMM) 420, which may also be known as a hypervisor layer, is a software layer that resides between the system hardware 410 (which may, for example, be the processing device 300 from FIG. 3) and the one or more operating systems ("OS" or "OSes") 430. On virtualized systems, an OS 430 may be called a "guest" OS 430. On systems that do not employ virtualization, an OS 430 typically interfaces directly with the hardware 410. When virtualization is used, an OS 430 interfaces with the hardware 410 through the VMM 420. The VMM 420 is able to support multiple OSes (such as the three OSes 430 illustrated in FIG. 4), and assign to each OS 430 dedicated or shared access to the system resources. In this way, each OS 430 may run concurrently with the other OSes 430. Further, each OS 430 may run multiple applications, such as applications 440 illustrated running on OS 430 in FIG. 4.

On systems without virtualization, an OS kernel typically executes at a highest privilege level, above other software executing on the system. With virtualization, the VMM 420 may utilize hardware virtualization features of processor and runs at a privilege even above the OS kernel. With hardware-assisted virtualization, memory page access permissions may be enforced by the VMM 420. Accordingly, the VMM 420 is able to set Read/Write/Execute permissions on physical memory pages. Each memory page may be defined to allow/disallow read, write, and execute privileges. The permissions are set by VMM 420 for an OS 430 executing on the system. If the OS 430 violates the permissions for a given memory page, control is transferred immediately to a predefined location in the VMM 420 while suspending that OS 430. VMM 420 may be equipped with a generic unpacker 422, which will help analyze, categorize, and scan the run-time executable in memory upon page permission violations. Generic unpacker 422 may contain a heuristics engine 424, a scanner 426, and a database or memory containing heuristics statistics data 428.

When access to a memory page is requested by the OS 430, the processor 310 will check the memory page permissions before permitting the requested type of access. Accordingly, the processor 310 does not allow any execution from a memory page if the page does not have execution permissions set. While compiling a program, a programmer can specifically set other permissions for the pages of a section, such as by using compiler directives. Referring again to FIG. 1, code section(s) 110 are required to at least have read and execute permissions set for their memory pages. If not, at run-time, the executable 101 may generate data execution prevention faults on the executing processor if data execution protection is enabled. Data section(s) 115 are required to have at least read permission set for their pages when loaded in memory. However, both read and write permissions may be set for data sections.

Generic Unpacking Using Hardware-Assisted Virtualization

Figure 5:
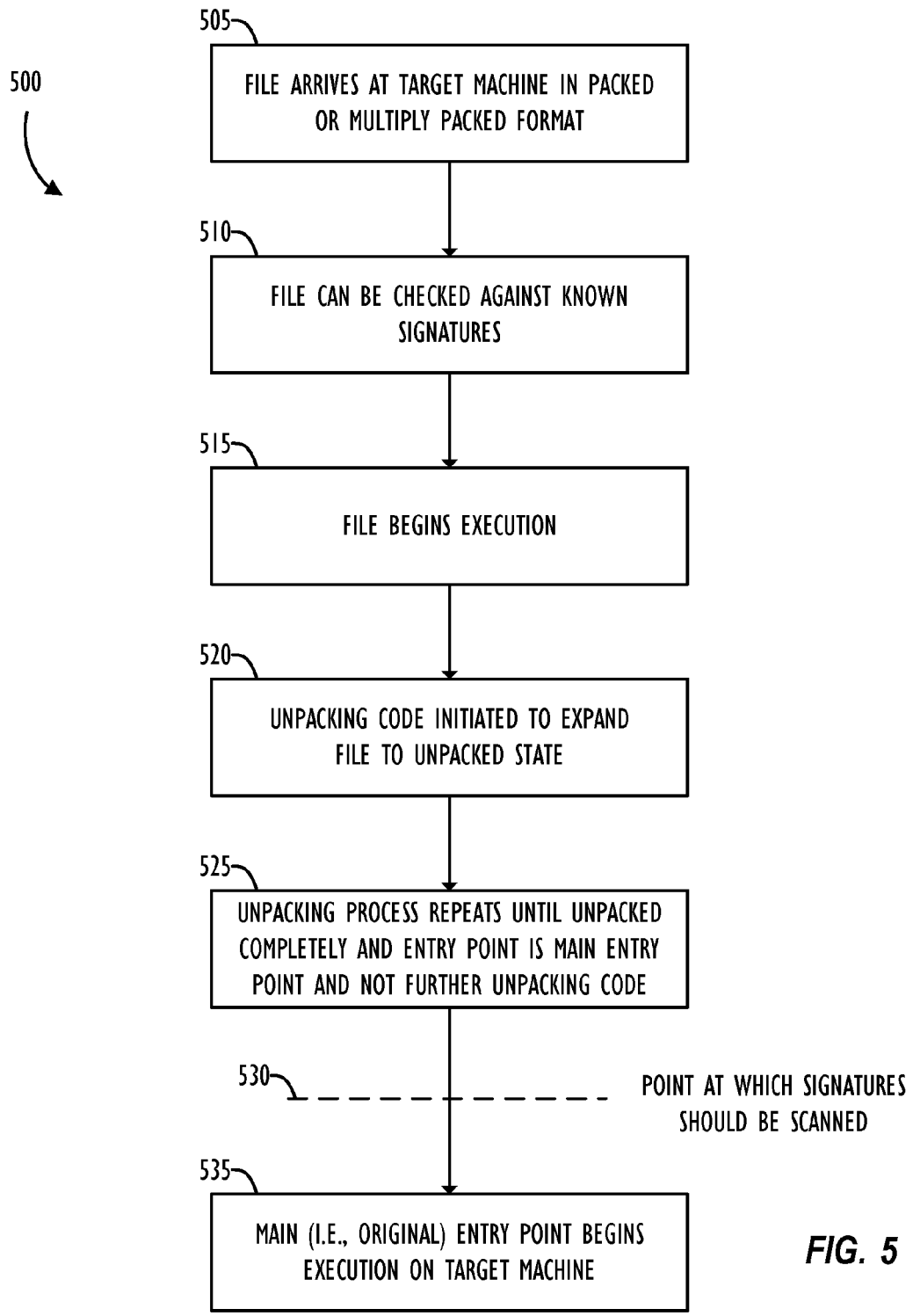
FIG. 5 is a flowchart illustrating a technique to generically unpack an executable until no further unpacking is required according to one or more disclosed embodiments.

In order to provide a flexible solution that works across multiple packers and packing algorithms—known or unknown—and limit the difficulties associated with unpacking a packed executable, a controlled method allows generically unpacking a packed executable without specific knowledge of the unpacker or unpacking algorithm. FIG. 5 demonstrates a method 500 in which a packed executable is delivered to a target computer and begins execution. At 505, the self-extracting executable file arrives at the target machine in a packed or iteratively-packed format. At this point the file may be scanned against known signatures at 510 to see if it matches any known malware. As described above, however, malware detection at this point may be unsuccessful against any unidentified packed executables. At 515, the file begins execution. At this point, the unpacker code segment of the binary (e.g., packer code section 130 from FIG. 1) begins execution. At 520, the unpacking process continues. If the file has been iteratively packed, then it must be iteratively unpacked, as shown at 525. After this unpacking process has been completed, the original executable of the binary is exposed. As shown at 530, at this point, at which the unpacker code has completed execution and the original executable has not yet started execution, another signature scan may be performed. In other words, as shown at point 530, generic unpacking would allow the packed executable to execute and prevent execution before or just before control is transferred to the Original Entry Point ("OEP") of the original executable, shown at 535. The Original Entry Point is the Entry Point as specified in binary header of the executable binary when it was in its original unpacked form. As noted above, emulated execution may be used to arrive at this point, but there are many packers which contain anti-emulation code that prevents the unpacking process from further executing after detecting that the packer code is being emulated.

Techniques are described below to using hardware-assisted virtualization to allow a packed executable to execute in controlled manner while performing scanning of the executable in memory at regular intervals using heuristics to identify and scan the unpacked executable just before control is transferred to the OEP. In systems without hardware virtualization features, or where hardware virtualization features were not enabled, these techniques might still be used and implemented in software if a privilege level higher than the OS privilege level exists.

Controlled Execution of Binary: Hardware-Assisted Virtualization

Catching malware just before control is transferred to the OEP is a goal of any generic unpacking solution. To arrive at this point, the unpacking code is executed in a controlled manner, and the memory space of the executable is scanned and compared against signatures at regular intervals.

Controlled execution may be attained with hardware-assisted virtualization. As discussed above, the VMM 420, which executes at the highest privilege level, can set read/write/execute (R/W/X) access protections at a page-level granularity for OS page accesses. This mechanism of setting memory protections on OS pages for OS accesses can be used to set protections on sections of the packed executable and its associated memory. Whenever page access permission violations occur, the VMM 420 gains control of execution and can check heuristically if the OEP transfer is going to happen or if sufficient unpacking has happened. At this point, scanning against malware signatures may be performed, or other malware detection techniques may be performed.

To make a heuristic determination regarding the transfer to the OEP, the generic unpacking process needs to control the execution of the binary at key intervals. These key intervals may be defined as follows. Binary Load Time may be defined as the time at which the target packed executable binary is loaded in memory and execution has not yet started. Entry Point Execution Violation Time may be defined as the time at which the control of execution is transferred to the Entry Point of the packed binary. A Write Violation Time may be defined as the time at which an attempt is made to write to pages marked by VMM 420 as executable and readable (but not writeable). Page Execution Violation Time may be defined as the time at which an attempt is made to execute instructions from pages marked by VMM 420 as readable and writable (but not executable).

Figure 6A:
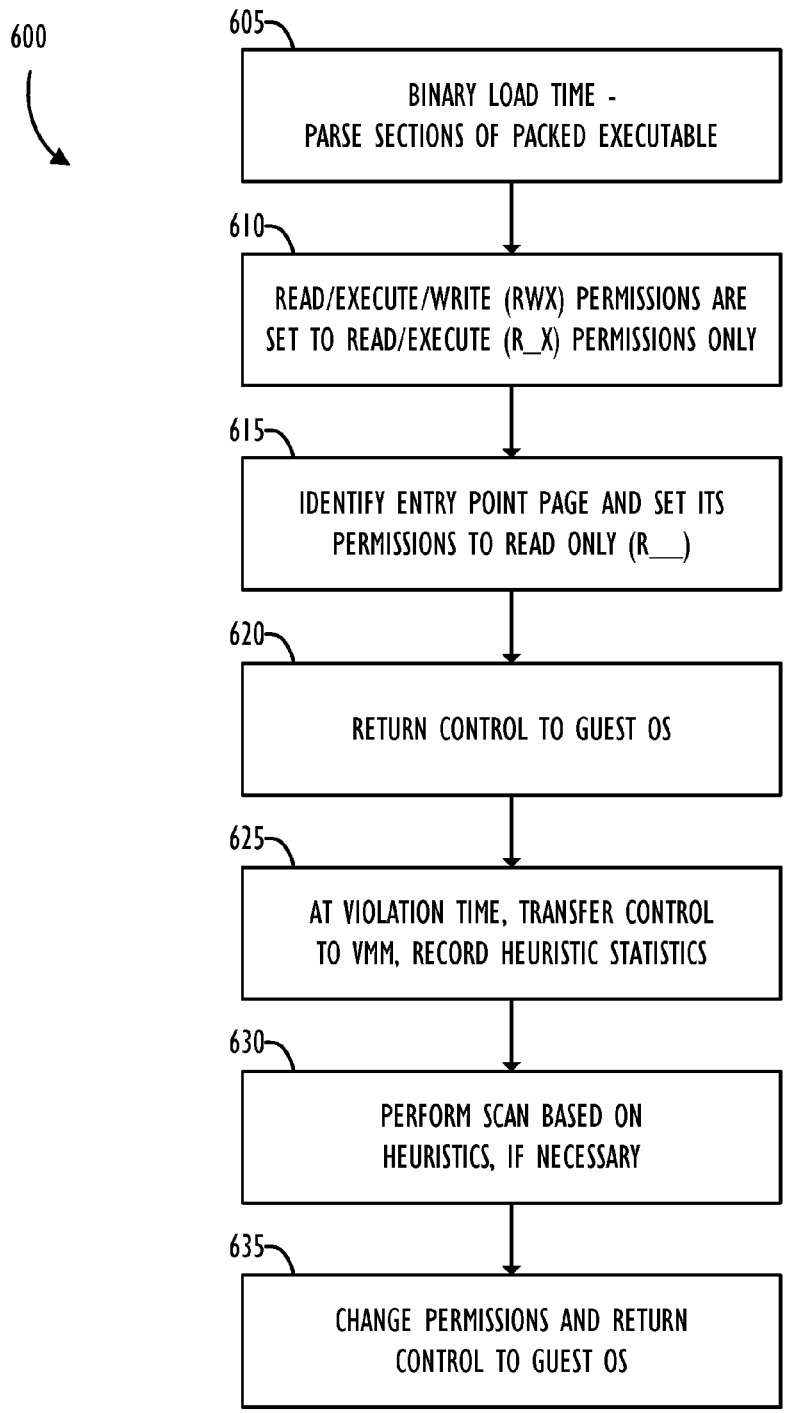
FIG. 6A is a flowchart illustrating a technique to set memory page permissions and address memory page permission violations to control memory access to pages of memory during the generic unpacking and execution phases of an executable according to one or more disclosed embodiments.

Referring to FIG. 6A, diagram 600 demonstrates a method to control execution of a self-extracting executable. At Binary Load Time 605, all the sections in the header of the packed executable binary are parsed. At 610, where sections are marked as executable and writable (RWX) in the binary header, permissions of read and execute (R_X) are assigned using the VMM 420 on pages associated with that section in memory. Write permissions are removed for these pages. "RWX" and "R_X" are examples of a notation indicating the setting of one or more read, write, and execute permissions. If pages of these sections attempt to execute at a future time without being written onto, no flag should be raised. However, if a page from one of these sections executes after being written onto, there is a possibility that it is the original unpacked code which is being executed. This is because the original code may have been written into the memory page during the unpacking process (i.e., the write access), and subsequent execution might indicate that the original executable is executing. In a situation where a file has been packed multiple times, the write may be to write that the next layer of unpacking code into the memory page, and thus subsequent execution would not be that of the original executable, but of an iteration of unpacking code. In either case, this time period presents a point at which a malware scan may be performed. Thus, a write access to any of these pages generates a "vmexit," and control is transferred to the VMM 420.

A vmexit is a hardware-assisted virtualization mechanism which transfers control from the OS 430 to the VMM 420. While control is with the VMM 420, the processor register states, stack pointer, and other states relating to execution of the unpacker code may be recorded. Once the states are recorded and other tasks are performed (e.g., building heuristics data, scanning), control may be passed back to the OS 430 that generated the vmexit or may be passed to an error handling routine.

At 615, the page which contains the Entry Point of the self-extracting executable may be identified, and permissions for that page should be set to read only (R_). After all permissions in page memory have been set by the VMM 420, control is returned to the OS 430 at 620. Execution of the Entry Point will generate a vmexit at the Entry Point Execution Violation Time, as shown at 625, and the VMM 420 will gain control. Accordingly, at this point, the stack pointer value and stack contents representing the start of execution may be recorded in the heuristics statistics data 428 of the generic unpacker 422. The state at the start of execution is useful for building heuristics because it is the state which is expected by the original unpacked program. Each time control is passed to the VMM 420 after a violation time, a scan of memory may also be performed by scanner 426 based on heuristics analysis by heuristics engine 424, as shown at 630. At 635, where sections are marked as writable and executable (RWX) in the binary header, permissions of read and execute but no write (R_X) are assigned. After page permissions are changed, control may be returned to the OS 430.

When the unpacker stub of the self-extracting executable begins execution, there may be multiple page access violations, each of which cause control to be passed to the VMM 420. At each of these times, heuristic statistics 428 may be gathered (625), scans may be performed (630), and permissions may be adjusted and control returned to the OS (635). Examples of violations and actions based on the violations will be discussed in greater detail below. In certain situations, while control is at VMM 420, the generic unpacker 422 may determine through a scan that a known packing algorithm for a packing iteration of an iteratively packed executable is recognized. If so, the generic unpacker 422 may proceed by unpacking the contents itself rather than by controlled execution. If a subsequent packing iteration is unrecognized, the generic unpacker 422 may return to controlled execution of the executable.

Figure 6B:
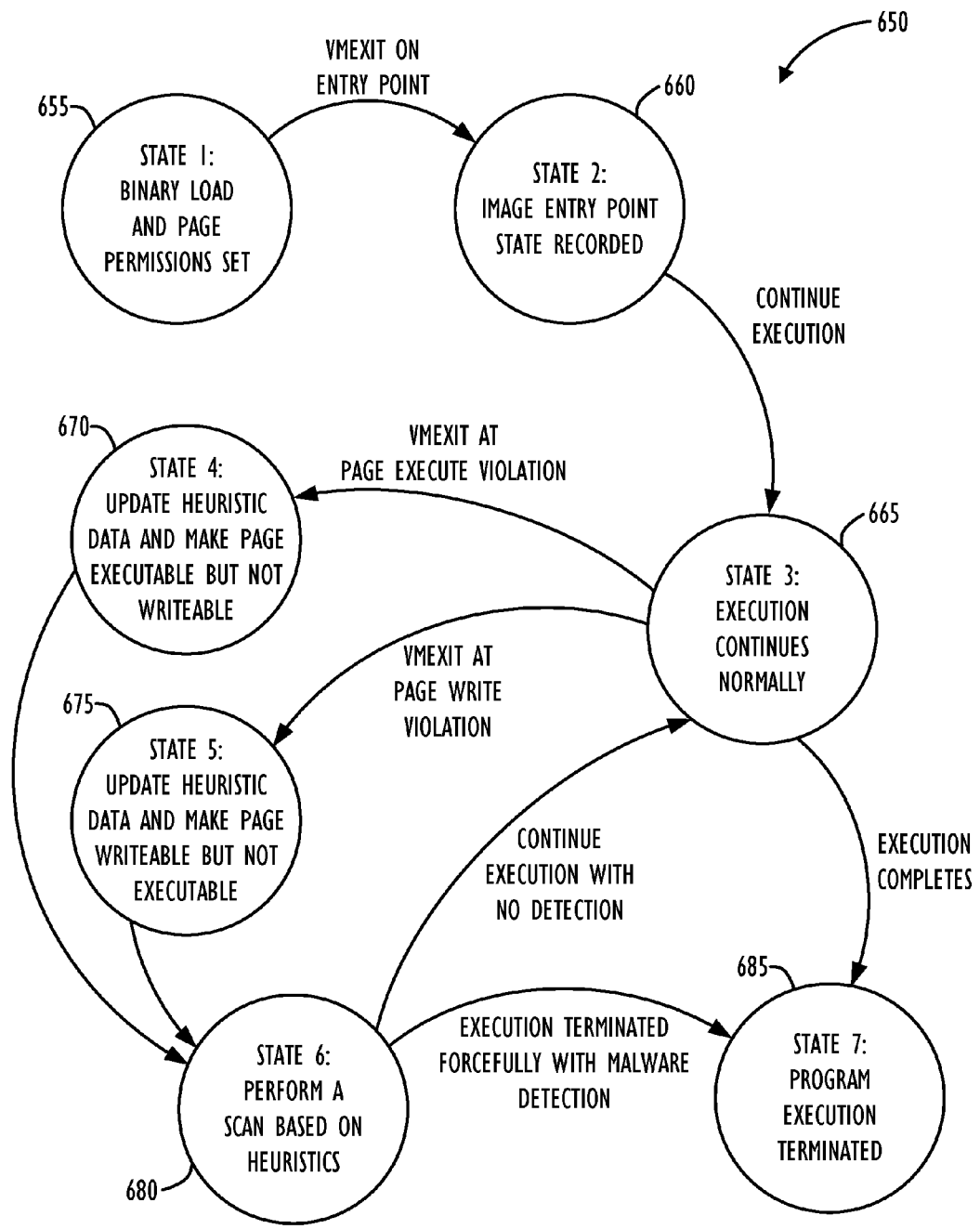
FIG. 6B illustrates state diagram 650, which shows the state transitions for the controlled execution of an executable from its binary load time to the termination of its execution.

FIG. 6B shows a state diagram 650 demonstrating the state transitions during execution of an executable. State 1 (655) represents Binary Load Time, which has been described above. After setting permissions and recording the state at Binary Load Time, a vmexit at the Entry Point Execution Violation Time results in entering State 2 (660), at which time the image entry point state is recorded. Control is returned to the OS, and execution continues normally at State 3 (665).

At a Write Violation Time, State 5 (675) is entered, and the VMM 420 transfers control to the generic unpacker 422. The generic unpacker 422 updates its internal bookkeeping heuristic statistical data 428. This may include the number of pages of the particular section that are being written on to, the number of times this particular page has being written, etc. The generic unpacker 422 also makes the particular page writable (+W) for the OS 430 but removes execute (−X) access. At State 6 (680), based on heuristics, a heuristic engine 424 of the generic unpacker 422 may trigger a scan in memory of malware signatures. If no signature is found or if no scan is performed based on heuristics, the generic unpacker 422 determines that unpacking is still not complete, and control is passed to OS 430 and execution continues at State 3 (665). If a malware signature is found, then execution of the executable may be forcefully terminated, as shown at the transition to State 7 (685).

Similarly, at the Page Execution Violation Time, State 4 (670) is entered, and the VMM 420 transfers control to the generic unpacker 422. The generic unpacker 422 updates its internal bookkeeping heuristic statistical data 428, which may include the number of pages of the particular section that have violated execution access permissions, the number of times the particular page has violated execution access permissions, etc. The generic unpacker 422 also makes the particular page executable (+X) for the OS 430 but removes write (−W) access. A scan may be performed at State 6 (680), and execution may continue at State 3 (665) or be terminated at State 7 (685).

Scanning for signatures may be performed at each page violation time, but heuristics may be used to optimize and conserve processing resources to avoid scanning each time a page violation occurs. For example, at each Page Execution Violation Time, one heuristic that may be used is to compare the stack pointer and the stack contents to their original values. If the stack pointer value is equal to the stack pointer value recorded at the Entry Point Execution Violation Time (i.e., State 2 (660)), and the stack contents are also the same, there is a possibility that the OEP is about to execute. The stack pointer and stack contents returning to their original Entry Point Execution Violation Time values may indicate that the unpacker processes have run to completion and scanning should be performed.

Another heuristic may be to locate the section from which the page execution violation was trapped. If all the pages of this section have been written to, and this is first execution violation from this section subsequent to the writing, then there may be a high probability that all the pages in this section have been unpacked by unpacker stub, and control is being transferred to the OEP. At this point, scanning should be performed. In another situation, if all the pages of a particular section have not been written to, and the first execution violation is trapped from the section, then there is still a probability that the section is fully unpacked, and scanning should be performed. Other techniques may be used to recognize completion of the unpacking of the executable.

Heuristics may also be employed at a Page Write Violation Time. If at a write violation, the page from which the write violation originated is the last page of a particular section that is being written to, there is a high probability that the section is completely unpacked. At this point, scanning should be performed.

The above example heuristics are based on the identification of situations in which control may be being passed to the OEP of the unpacked binary. Other heuristics may be employed as desired. For example, additional heuristics may be built based at least in part on specific characteristics of other packers, such as signatures of packer code, characteristics of the execution of other packers, etc. The heuristics described above may be combined with these other heuristics, or the other heuristics may replace the example heuristics described above. Where new heuristics are needed to identify certain packers, an update of new heuristic mechanisms would likely be faster and more efficient than writing a new unpacker for an antivirus program.

As explained above, comparing a virus signature to a binary is preferably performed after that binary is fully unpacked but before that binary has begun to execute. In this way, the binary executable is not obfuscated and hidden through a packing process and can be compared with virus signature files directly in memory while preventing the binary from executing before the malware scanning is performed. Further, other malware detection techniques in addition to, or instead of, signature scanning may be performed. In summary, execution of the unpacking code is allowed, but execution is prevented or interrupted before the uncompressed, unpacked binary begins execution of the Original Entry Point.

Figure 7:
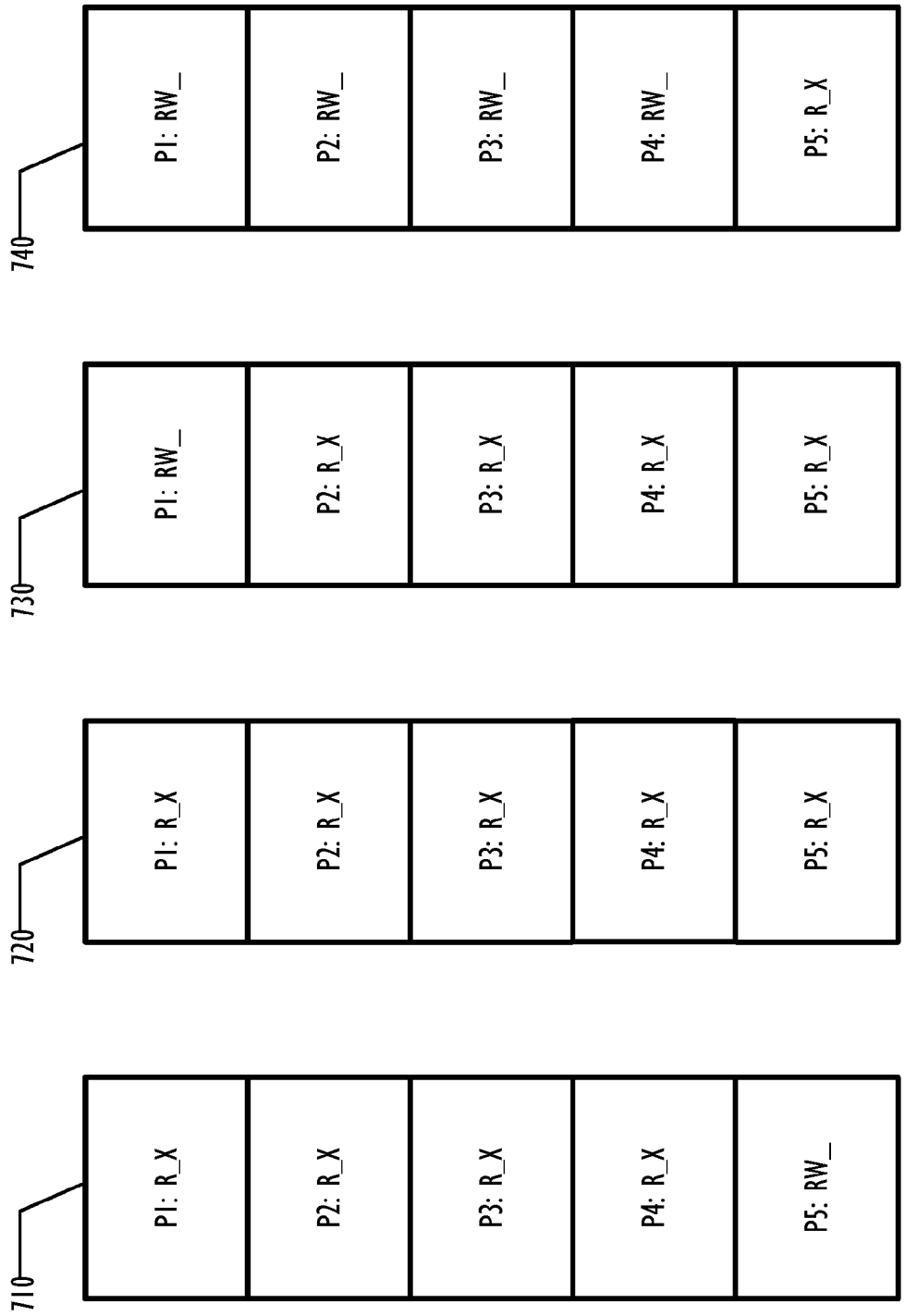
FIG. 7 is a block diagram illustrating various stages of page memory permissions seen during the generic unpacking and execution phases of an executable according to one or more disclosed embodiments.

FIG. 7 illustrates an example of a heuristic for determining the start of execution of the Original Entry Point, and the subsequent prevention of its execution. In FIG. 7, four states 710, 720, 730, and 740 of the heuristic are shown. Each state shows the permissions set for OS memory pages P1, P2, P3, P4, and P5 for a given set of memory page accesses at a point in time during execution. As will be described in detail below, the progression of the execution leads to the changes in states. Memory pages P1-P4 form the virtual code section 125, and page P5 forms the packer code section 130. In this example, the unpacker code section 130 only occupies one page, i.e. page P5. The unpacker stub from page P5 will unpack code into pages P1-P4. The permissions for pages P1-P5 are defined by the binary header 120 (not shown in FIG. 6B).

At initial state 710, the permissions for the pages are set differently from the definitions in the binary header. Thus, while the binary header specifies that page P5, which contains the executable unpacker stub, should have execute and write permissions, page P5 is set to allow read and write permissions but not the execute permission at initial state 710. Accordingly, page P5 is represented as "RW_" at initial state 660, and execution will trigger a vmexit. Similarly, while pages P1-P4 are defined in the binary header as having read, write, and execute permissions, pages P1-P4 are set to allow read and execute permissions but not the write permission at initial state 660. Accordingly, pages P1-P4 are represented as "R_X" at initial state 660.

When code in page P5 first attempts to execute, a vmexit will be triggered because page P5 does not have execution permissions set. If multiple pages are set to write access, then the first page of those pages to trigger a vmexit may be identified as the Entry Point Execution Violation Time. In this example, with page P5 being the only such page, the first attempt to execute code stored anywhere in page P5 is an indication of the Entry Point Execution Violation Time. After appropriate processing is completed, as described above (such as recording the stack pointer, contents, and other state information), page P5 permissions are changed to add execution permissions (i.e., enabling 'X') but remove write permissions (i.e., disabling 'W'). This is shown at second state 720.

Looking at pages P1-P4, these pages have started out without write permissions. Subsequently, when a write is attempted at any of pages P1-P4, a vmexit is triggered. A write anywhere in one of these pages is also an indication that the code being written is meant to be executed sometime later. In the example, a write to page P1 is attempted, and a vmexit is triggered. At state 730, page P1 permissions have been changed to add write permissions (i.e., enabling 'W') but remove execute permissions (i.e., disabling 'X'). Thus, any subsequent execution attempt at page P1 will trigger a vmexit, returning control again to the VMM 420. Once the permissions for P1 have been adjusted, the VMM 420 returns control to the OS 430, which, in turn, returns control to the unpacker stub. At this point, the original write instruction (which triggered the vmexit) may be allowed to complete, and the unpacker stub writes to page P1.

In this manner, pages P1-P4 may be written to a number of times. Each time a first write attempt at a page occurs, a vmexit will be triggered, and the permissions will be changed as described above with respect to page P1. As noted above, at each of these points, heuristic statistics 428 may be gathered before permissions are changed and control is returned to the OS 430. State 740 shows a situation in which each of pages P1-P4 have been attempted to be written to, a vmexit was generated, and permissions were changed to remove execute access and permit write access. As noted above, at various states, based on heuristic analysis, scans may be performed to determine whether a signature can be recognized.

At state 690, in the example, assume that all writing (i.e., unpacking) has been completed. At this point, the unpacker code stub from P5 completes execution, and attempts to transfer control to the Original Entry Point (which resides somewhere in P1-P4) of the unpacked executable. Assume that page P3 has the Original Entry Point (OEP) for the original unpacked executable binary, and page P5 attempts to transfer control to it. An execution attempt anywhere in page P3 generates a vmexit. At this point, control is transferred to the VMM 420, and the heuristic generic unpacker engine gets control. The generic unpacker engine at this point can determine that pages P1-P4 have all been written to, and that this is the first execution violation in this section. Accordingly, as noted above, there is a high chance that the OEP is being executed and hence the whole section should be scanned.

If, at this stage, pages P1-P4 contain unpacked malware, the malware may be identified by the signature scan. If, on the other hand, nothing is found, page P3 permissions may be marked to allow execution access and disallow write access. Execution may continue until a vmexit triggers again, and a new heuristic criterion is met. Eventually, if no further heuristic is triggered or pages P1-P4 complete execution after multiple iterations of unpacking without any identification of malware, it may be determined that the unpacked executable is not malware (or, at least that a malware signature is not known for the unpacked binary).

EXAMPLES

The following examples pertain to further embodiments of this disclosure.

1. A method of unpacking a self-extracting executable to detect malware by loading a self-extracting executable into memory, the self-extracting executable comprising a first unpacking stub and a packed executable; allowing the first unpacking stub to unpack the packed executable into an unpacked executable; detecting completion of the first unpacking stub using one or more heuristics; and scanning the unpacked executable for malware.

2. The method of example 1, wherein the packed executable is an iteratively packed executable comprising one or more intermediate self-extracting executables, wherein the instructions to cause one or more processing units to allow the first unpacking stub to unpack the packed executable comprise instructions to cause one or more processing units to allow the first unpacking stub to unpack the packed executable into one of the one or more intermediate self-extracting executables; and allow the one of the one or more intermediate self-extracting executables to unpack successively until a final unpacking stub unpacks a final packed executable into a final unpacked executable, wherein the instructions to cause one or more processing units to scan the unpacked executable for malware comprise instructions to cause one or more processing units to scan the final unpacked executable for malware.

3. The method of example 2, wherein scanning the unpacked executable for malware further comprises scanning at least at least one of the one or more intermediate self-extracting executables for malware.

4. The method of example 2, wherein the final unpacked executable is not allowed to execute if malware is detected.

5. The method from any of the preceding examples, wherein allowing the first unpacking stub to unpack the packed executable comprises using hardware assisted virtualization to control memory page access permissions to detect an attempt to execute code that was previously written into a memory page by the first unpacking stub.

6. The method from any of the preceding examples, wherein allowing the first unpacking stub to unpack the packed executable comprises using hardware assisted virtualization to control memory page access permissions to detect execution of an entry point of the self-extracting executable.

7. The method from any of the preceding examples, wherein allowing the first unpacking stub to unpack the packed executable comprises using hardware assisted virtualization to control memory page access permissions to detect writing to a memory page in which code was previously executed.

8. The method from any of the preceding examples, wherein allowing the first unpacking stub to unpack the packed executable further comprises: using hardware assisted virtualization to, after detecting the writing, pause execution of the first unpacking stub; collecting heuristics statistics while execution of the first unpacking stub is paused; determining whether memory should be scanned based on the heuristics statistics; scanning memory based upon the determination; and allowing execution of the first unpacking stub to continue.

9. The method from any of the preceding examples, wherein scanning the unpacked executable is performed prior to execution of the unpacked executable.

10. The method from any of the preceding examples, wherein the packed executable was packed using an unknown or undetectable packing algorithm.

11. The method from any of the preceding examples, wherein the one or more heuristics comprise a heuristic to compare a stack pointer value and stack contents recorded prior to detecting completion of the first unpacking stub with a stack pointer value and stack contents recorded prior to allowing the first unpacking stub to begin unpacking the packed executable.

12. The method from any of the preceding examples, wherein allowing the first unpacking stub to unpack the packed executable comprises controlling execution of the first unpacking stub while allowing the first unpacking stub to unpack the packed executable into an unpacked executable.

13. A system configured to unpack a self-extracting executable to detect malware, comprising: a memory and one or more processing units, communicatively coupled to the memory, wherein the memory stores instructions to cause the one or more processing units to: load a self-extracting executable into memory, the self-extracting executable comprising a first unpacking stub and a packed executable; allowing the first unpacking stub to unpack the packed executable into an unpacked executable; detect completion of the first unpacking stub using one or more heuristics; and scan the unpacked executable for malware.

14. The system of example 13, wherein the packed executable is an iteratively packed executable comprising one or more intermediate self-extracting executables, wherein the instructions to cause one or more processing units to allow the first unpacking stub to unpack the packed executable comprise instructions to cause one or more processing units to allow the first unpacking stub to unpack the packed executable into one of the one or more intermediate self-extracting executables; and allow the one of the one or more intermediate self-extracting executables to unpack successively until a final unpacking stub unpacks a final packed executable into a final unpacked executable, wherein the instructions to cause one or more processing units to scan the unpacked executable for malware comprise instructions to cause one or more processing units to scan the final unpacked executable for malware.

15. The system of example 14, wherein scanning the unpacked executable for malware further comprises scanning at least at least one of the one or more intermediate self-extracting executables for malware.

16. The system of example 14, wherein the final unpacked executable is not allowed to execute if malware is detected.

17. The system from any of the preceding examples, wherein allowing the first unpacking stub to unpack the packed executable comprises using hardware assisted virtualization to control memory page access permissions to detect an attempt to execute code that was previously written into a memory page by the first unpacking stub.

18. The system from any of the preceding examples, wherein allowing the first unpacking stub to unpack the packed executable comprises using hardware assisted virtualization to control memory page access permissions to detect execution of an entry point of the self-extracting executable.

19. The system from any of the preceding examples, wherein allowing the first unpacking stub to unpack the packed executable comprises using hardware assisted virtualization to control memory page access permissions to detect writing to a memory page in which code was previously executed.

20. The system from any of the preceding examples, wherein allowing the first unpacking stub to unpack the packed executable further comprises: using hardware assisted virtualization to, after detecting the writing, pause execution of the first unpacking stub; collecting heuristics statistics while execution of the first unpacking stub is paused; determining whether memory should be scanned based on the heuristics statistics; scanning memory based upon the determination; and allowing execution of the first unpacking stub to continue.

21. The system from any of the preceding examples, wherein scanning the unpacked executable is performed prior to execution of the unpacked executable.

22. The system from any of the preceding examples, wherein the packed executable was packed using an unknown or undetectable packing algorithm.

23. The system from any of the preceding examples, wherein the one or more heuristics comprise a heuristic to compare a stack pointer value and stack contents recorded prior to detecting completion of the first unpacking stub with a stack pointer value and stack contents recorded prior to allowing the first unpacking stub to begin unpacking the packed executable.

24. The system from any of the preceding examples, wherein allowing the first unpacking stub to unpack the packed executable comprises controlling execution of the first unpacking stub while allowing the first unpacking stub to unpack the packed executable into an unpacked executable.

25. A computer-readable medium comprising computer executable instructions stored thereon to cause one or more processing units to: load a self-extracting executable into memory, the self-extracting executable comprising a first unpacking stub and a packed executable; allow the first unpacking stub to unpack the packed executable into an unpacked executable; detect completion of the first unpacking stub using one or more heuristics; and scan the unpacked executable for malware.

26. The computer-readable medium of example 25, wherein the packed executable is an iteratively packed executable comprising one or more intermediate self-extracting executables, wherein the instructions to cause one or more processing units to allow the first unpacking stub to unpack the packed executable comprise instructions to cause one or more processing units to allow the first unpacking stub to unpack the packed executable into one of the one or more intermediate self-extracting executables; and allow the one of the one or more intermediate self-extracting executables to unpack successively until a final unpacking stub unpacks a final packed executable into a final unpacked executable, wherein the instructions to cause one or more processing units to scan the unpacked executable for malware comprise instructions to cause one or more processing units to scan the final unpacked executable for malware.

27. The computer-readable medium of example 26, wherein the instructions to cause one or more processing units to scan the unpacked executable for malware further comprise instructions to cause one or more processing units to scan at least one of the one or more intermediate self-extracting executables for malware.

28. The computer-readable medium of example 26, wherein the final unpacked executable is not allowed to execute if malware is detected.

29. The computer-readable medium from any of the preceding examples, wherein the instructions to cause one or more processing units to allow the first unpacking stub to unpack the packed executable comprise instructions to cause one or more processing units to use hardware assisted virtualization to control memory page access permissions to detect an attempt to execute code that was previously written into a memory page by the first unpacking stub.

30. The computer-readable medium from any of the preceding examples, wherein the instructions to cause one or more processing units to allow the first unpacking stub to unpack the packed executable comprise instructions to cause one or more processing units to use hardware assisted virtualization to control memory page access permissions to detect execution of an entry point of the self-extracting executable.

31. The computer-readable medium from any of the preceding examples, wherein the instructions to cause one or more processing units to allow the first unpacking stub to unpack the packed executable comprise instructions to cause one or more processing units to use hardware assisted virtualization to control memory page access permissions to detect writing to a memory page in which code was previously executed.

32. The computer-readable medium from any of the preceding examples, wherein the instructions to cause one or more processing units to allow the first unpacking stub to unpack the packed executable further comprise instructions to cause one or more processing units to: use hardware assisted virtualization to, after detecting the writing, pause execution of the first unpacking stub; collect heuristics statistics while execution of the first unpacking stub is paused; determine whether memory should be scanned based on the heuristics statistics; scan memory based upon the determination; and allow execution of the first unpacking stub to continue.

33. The computer-readable medium from any of the preceding examples, wherein scanning the unpacked executable is performed prior to execution of the unpacked executable.

34. The computer-readable medium from any of the preceding examples, wherein the packed executable was packed using an unknown or undetectable packing algorithm.

35. The computer-readable medium from any of the preceding examples, wherein the one or more heuristics comprise a heuristic to compare a stack pointer value and stack contents recorded prior to detecting completion of the first unpacking stub with a stack pointer value and stack contents recorded prior to allowing the first unpacking stub to begin unpacking the packed executable.

36. The computer-readable medium from any of the preceding examples, wherein the instructions to cause one or more processing units to allow the first unpacking stub to unpack the packed executable comprise instructions to cause one or more processing units to control execution of the first unpacking stub while allowing the first unpacking stub to unpack the packed executable into an unpacked executable.

37. A device configured to unpack a self-extracting executable to detect malware, comprising modules to: load a self-extracting executable into memory, the self-extracting executable comprising a first unpacking stub and a packed executable; allowing the first unpacking stub to unpack the packed executable into an unpacked executable; detect completion of the first unpacking stub using one or more heuristics; and scan the unpacked executable for malware.

38. The device of example 37, wherein the packed executable is an iteratively packed executable comprising one or more intermediate self-extracting executables, wherein the instructions to cause one or more processing units to allow the first unpacking stub to unpack the packed executable comprise instructions to cause one or more processing units to allow the first unpacking stub to unpack the packed executable into one of the one or more intermediate self-extracting executables; and allow the one of the one or more intermediate self-extracting executables to unpack successively until a final unpacking stub unpacks a final packed executable into a final unpacked executable, wherein the instructions to cause one or more processing units to scan the unpacked executable for malware comprise instructions to cause one or more processing units to scan the final unpacked executable for malware.

39. The device of example 38, wherein scanning the unpacked executable for malware further comprises scanning at least one of the one or more intermediate self-extracting executables for malware.

40. The device of example 38, wherein the final unpacked executable is not allowed to execute if malware is detected.

41. The device from any of the preceding examples, wherein allowing the first unpacking stub to unpack the packed executable comprises using hardware assisted virtualization to control memory page access permissions to detect an attempt to execute code that was previously written into a memory page by the first unpacking stub.

42. The device from any of the preceding examples, wherein allowing the first unpacking stub to unpack the packed executable comprises using hardware assisted virtualization to control memory page access permissions to detect execution of an entry point of the self-extracting executable.

43. The device from any of the preceding examples, wherein allowing the first unpacking stub to unpack the packed executable comprises using hardware assisted virtualization to control memory page access permissions to detect writing to a memory page in which code was previously executed.

44. The device from any of the preceding examples, wherein allowing the first unpacking stub to unpack the packed executable further comprises: using hardware assisted virtualization to, after detecting the writing, pause execution of the first unpacking stub; collecting heuristics statistics while execution of the first unpacking stub is paused; determining whether memory should be scanned based on the heuristics statistics; scanning memory based upon the determination; and allowing execution of the first unpacking stub to continue.

45. The device from any of the preceding examples, wherein scanning the unpacked executable is performed prior to execution of the unpacked executable.

46. The device from any of the preceding examples, wherein the packed executable was packed using an unknown or undetectable packing algorithm.

47. The device from any of the preceding examples, wherein the one or more heuristics comprise a heuristic to compare a stack pointer value and stack contents recorded prior to detecting completion of the first unpacking stub with a stack pointer value and stack contents recorded prior to allowing the first unpacking stub to begin unpacking the packed executable.

48. The device from any of the preceding examples, wherein allowing the first unpacking stub to unpack the packed executable comprises controlling execution of the first unpacking stub while allowing the first unpacking stub to unpack the packed executable into an unpacked executable.

49. A device configured to unpack a self-extracting executable to detect malware, comprising: means for loading a self-extracting executable into memory, the self-extracting executable comprising a first unpacking stub and a packed executable; means for allowing the first unpacking stub to unpack the packed executable into an unpacked executable; means for detecting completion of the first unpacking stub using one or more heuristics, independent of knowledge of the first unpacking stub; and means for scanning the unpacked executable for malware.

50. The device of preceding example, wherein the packed executable comprises a sequence of self-extracting executables, each member of the sequence except the last comprising an unpacking stub and a successor self-extracting executable, wherein the last member comprises a final unpacking stub and a final packed executable, wherein the means for allowing the first unpacking stub to unpack the packed executable comprise: means for allowing the first unpacking stub to unpack the packed executable into a first member of the sequence of self-extracting executables; and means for allowing each member of the sequence of self-extracting executables to unpack the successor self-extracting executable until the final unpacking stub unpacks the final packed executable into a final unpacked executable, wherein means for scanning the unpacked executable for malware comprise means for scanning the final unpacked executable for malware.

The specifics in the examples above may be used anywhere in one or more embodiments. For instance, all optional features of the apparatus as described above may also be implemented as methods or processes as described herein. Further, the examples above may be implemented in one device or multiple devices in a system.

The above described examples and embodiments may be implemented as computer-executable instructions or code in embodied in a computer-readable storage medium. The computer-executable instructions or computer program products as well as any data created and used during implementation of the disclosed technologies can be stored on one or more tangible computer-readable storage media, such as optical media discs (e.g., DVDs, CDs), volatile memory components (e.g., DRAM, SRAM), or non-volatile memory components (e.g., flash memory, disk drives). Computer-readable storage media can be contained in computer-readable storage devices such as solid-state drives, USB flash drives, and memory modules In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer-readable medium on which is stored software for unpacking a self-extracting executable, comprising instructions that when executed cause one or more processing units to:

load the self-extracting executable into memory, the self-extracting executable comprising a first unpacking stub and a packed executable;
allow the first unpacking stub to unpack the packed executable into an unpacked executable;
detect an attempt to write to a memory page in which code was previously executed, by controlling memory page access permissions using hardware assisted virtualization;
detect completion of unpacking the packed executable by the first unpacking stub using one or more heuristics; and scan the unpacked executable for malware, wherein the one or more heuristics comprise:
determining whether a write to a memory page that generates a page write exception is a write to a last page of a section of memory pages.

2. The non-transitory computer-readable medium of claim 1,
wherein the packed executable is an iteratively packed executable comprising one or more intermediate self-extracting executables,
wherein the instructions to cause one or more processing units to allow the first unpacking stub to unpack the packed executable comprise instructions to cause one or more processing units to:
allow the first unpacking stub to unpack the packed executable into one of the one or more intermediate self-extracting executables; and
allow the one of the one or more intermediate self-extracting executables to unpack successively until a final unpacking stub unpacks a final packed executable into a final unpacked executable,
wherein the instructions to cause one or more processing units to scan the unpacked executable for malware comprise instructions to cause one or more processing units to scan the final unpacked executable for malware.

3. The non-transitory computer-readable medium of claim 2, wherein the instructions to cause one or more processing units to scan the unpacked executable for malware further comprise instructions to cause one or more processing units to scan at least one of the one or more intermediate self-extracting executables for malware.

4. The non-transitory computer-readable medium of claim 2, wherein the final unpacked executable is not allowed to execute if malware is detected.

5. The non-transitory computer-readable medium of claim 1, wherein the instructions to cause one or more processing units to allow the first unpacking stub to unpack the packed executable comprise instructions to cause one or more processing units to use hardware assisted virtualization to control memory page access permissions to detect an attempt to execute code that was previously written into a memory page by the first unpacking stub.

6. The non-transitory computer-readable medium of claim 5, wherein the instructions to cause one or more processing units to allow the first unpacking stub to unpack the packed executable further comprise instructions to cause one or more processing units to:
use hardware assisted virtualization to, after detecting the attempt, pause execution of the first unpacking stub;
collect heuristics statistics while execution of the first unpacking stub is paused;
determine whether memory should be scanned based on the heuristics statistics;
scan memory based upon the determination; and
allow execution of the first unpacking stub to continue.

7. The non-transitory computer-readable medium of claim 1, wherein the instructions to cause one or more processing units to allow the first unpacking stub to unpack the packed executable comprise instructions to cause one or more processing units to use hardware assisted virtualization to control memory page access permissions to detect execution of an entry point of the self-extracting executable.

8. The non-transitory computer-readable medium of claim 1, wherein the one or more heuristics further comprise:
determining whether an attempt to execute code is a first attempt to execute code from a code section including the memory page after writing all pages of the code section.

9. The non-transitory computer-readable medium of claim 8, wherein the instructions to cause one or more processing units to allow the first unpacking stub to unpack the packed executable further comprise instructions to cause one or more processing units to:
use hardware assisted virtualization to, after detecting the writing, pause execution of the first unpacking stub;
collect heuristics statistics while execution of the first unpacking stub is paused;
determine whether memory should be scanned based on the heuristics statistics;
scan memory based upon the determination; and
allow execution of the first unpacking stub to continue.

10. The non-transitory computer-readable medium of claim 1, wherein scanning the unpacked executable is performed prior to execution of the unpacked executable.

11. The non-transitory computer-readable medium of claim 1, wherein the packed executable was packed using an unknown or undetectable packing algorithm.

12. The non-transitory computer-readable medium of claim 1, wherein the one or more heuristics comprise a heuristic to compare a stack pointer value and stack contents recorded prior to detecting completion of the first unpacking stub with a stack pointer value and stack contents recorded prior to allowing the first unpacking stub to begin unpacking the packed executable.

13. The non-transitory computer-readable medium of claim 1, wherein the instructions to cause one or more processing units to allow the first unpacking stub to unpack the packed executable comprise instructions to cause one or more processing units to control execution of the first unpacking stub while allowing the first unpacking stub to unpack the packed executable into an unpacked executable.

14. A method of unpacking a self-extracting executable to detect malware, comprising:
loading, using a processor, the self-extracting executable into memory, the self-extracting executable comprising a first unpacking stub and a packed executable;
allowing the first unpacking stub to unpack the packed executable into an unpacked executable;
detecting an attempt to write to a memory page in which code was previously executed, by controlling memory page access permissions using hardware assisted virtualization;
detecting, using a processor, completion of the first unpacking stub using one or more heuristics; and
scanning the unpacked executable for malware, wherein the one or more heuristics comprise:
determining whether a write to a memory page that generates a page write exception is a write to a last page of a section of memory pages.

15. The method of claim 14,
wherein the packed executable is an iteratively packed executable comprising one or more intermediate self-extracting executables,
wherein allowing the first unpacking stub to unpack the packed executable comprises:
   allowing the first unpacking stub to unpack the packed executable into one of the one or more intermediate self-extracting executables; and
   allowing the one of the one or more intermediate self-extracting executables to unpack successively until a final unpacking stub unpacks a final packed executable into a final unpacked executable, and
wherein scanning the unpacked executable for malware comprises scanning the final unpacked executable for malware.

16. The method of claim 15, wherein scanning the unpacked executable for malware further comprises scanning at least one of the one or more intermediate self-extracting executables for malware.

17. The method of claim 14, wherein allowing the first unpacking stub to unpack the packed executable comprises using hardware assisted virtualization to control memory page access permissions to detect an attempt to execute code that was previously written into a memory page by the first unpacking stub.

18. The method of claim 17, wherein allowing the first unpacking stub to unpack the packed executable further comprises:
   using hardware assisted virtualization to, after detecting the attempt, pause execution of the first unpacking stub;
   collecting heuristics statistics while execution of the first unpacking stub is paused;
   determining whether memory should be scanned based on the heuristics statistics;
   scanning memory based upon the determination; and
   allowing execution of the first unpacking stub to continue.

19. The method of claim 14, wherein scanning the unpacked executable is performed prior to execution of the unpacked executable.

20. The method of claim 14, wherein the packed executable was packed using an unknown or undetectable packing algorithm.

21. A system configured to unpack a self-extracting executable to detect malware, comprising:
   a memory; and one or more processing units, communicatively coupled to the memory, wherein the memory stores instructions to cause the one or more processing units to:
   load the self-extracting executable into memory, the self-extracting executable comprising a first unpacking stub and a packed executable;
   allow the first unpacking stub to unpack the packed executable into an unpacked executable;
   detect an attempt to write to a memory page in which code was previously executed, by controlling memory page access permissions using hardware assisted virtualization;
   detect completion of the first unpacking stub using one or more heuristics; and scan the unpacked executable for malware, wherein the one or more heuristics comprise:
      determining whether a write to a memory page that generates a page write exception is a write to a last page of a section of memory pages.

22. The system of claim 21,
wherein the packed executable is an iteratively packed executable comprising one or more intermediate self-extracting executables,
wherein the instructions to cause one or more processing units to allow the first unpacking stub to unpack the packed executable comprise instructions to cause one or more processing units to:
   allow the first unpacking stub to unpack the packed executable into one of the one or more intermediate self-extracting executables; and
   allow the one of the one or more intermediate self-extracting executables to unpack successively until a final unpacking stub unpacks a final packed executable into a final unpacked executable,
wherein the instructions to cause one or more processing units to scan the unpacked executable for malware comprise instructions to cause one or more processing units to scan the final unpacked executable for malware.

23. The system of claim 22, wherein the instructions to cause one or more processing units to scan the unpacked executable for malware further comprise instructions to cause one or more processing units to scan at least one of the one or more intermediate self-extracting executables for malware.

24. The system of claim 21, wherein the instructions to cause one or more processing units to allow the first unpacking stub to unpack the packed executable comprise instructions to cause one or more processing units to use hardware assisted virtualization to control memory page access permissions to detect an attempt to execute code that was previously written into a memory page by the first unpacking stub.

25. The system of claim 21, wherein the instructions to cause one or more processing units to allow the first unpacking stub to unpack the packed executable further comprise instructions to cause one or more processing units to:
   use hardware assisted virtualization to, after detecting the attempt, pause execution of the first unpacking stub;
   collect heuristics statistics while execution of the first unpacking stub is paused;
   determine whether memory should be scanned based on the heuristics statistics;
   scan memory based upon the determination; and
   allow execution of the first unpacking stub to continue.

* * * * *